US006973514B2

(12) United States Patent
Yamaguchi

(10) Patent No.: US 6,973,514 B2
(45) Date of Patent: Dec. 6, 2005

(54) PRINTING SYSTEM ADAPTED TO CHANGE A PRINTING OPERATION TO BE PERFORMED BASED ON A RESULT OF AN ACCOUNTING OPERATION

(75) Inventor: Fumiyoshi Yamaguchi, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/078,431

(22) Filed: Feb. 21, 2002

(65) Prior Publication Data

US 2002/0078275 A1 Jun. 20, 2002

Related U.S. Application Data

(62) Division of application No. 08/889,180, filed on Jul. 7, 1997, now Pat. No. 6,385,675.

(30) Foreign Application Priority Data

Jul. 5, 1996 (JP) .................................. 7-176428

(51) Int. Cl.[7] ......................... G06F 13/10; G03G 21/00
(52) U.S. Cl. ......................... 710/72; 710/62; 358/1.15; 705/400; 399/79; 399/80
(58) Field of Search ................................ 358/1.1, 1.15; 399/79, 80; 705/30, 33, 34, 400; 710/62, 710/72; 709/203

(56) References Cited

U.S. PATENT DOCUMENTS

| | | | | |
|---|---|---|---|---|
| 4,733,274 A | | 3/1988 | Tachika et al. | 399/85 |
| 4,839,829 A | * | 6/1989 | Freedman | 101/248 |
| 5,117,258 A | * | 5/1992 | Iwata | 399/79 |
| 5,130,757 A | | 7/1992 | Ito | 358/402 |
| 5,339,168 A | | 8/1994 | Evanitsky et al. | 358/402 |
| 5,383,129 A | | 1/1995 | Farrell | 705/400 |
| 5,608,544 A | | 3/1997 | Yamanishi | 358/453 |
| 5,610,688 A | | 3/1997 | Inamoto et al. | 399/366 |
| 5,619,024 A | * | 4/1997 | Kolls | 235/381 |
| 5,742,279 A | | 4/1998 | Yamamoto et al. | 345/173 |
| 5,761,651 A | | 6/1998 | Hasebe et al. | 705/400 |
| 5,825,988 A | | 10/1998 | Collard et al. | 395/112 |
| 5,835,689 A | | 11/1998 | Braun et al. | 395/113 |
| 6,151,590 A | | 11/2000 | Cordery et al. | 705/60 |
| 6,216,113 B1 | * | 4/2001 | Aikens et al. | 705/34 |
| 6,292,267 B1 | * | 9/2001 | Mori et al. | 358/1.15 |
| 6,385,675 B1 | * | 5/2002 | Yamaguchi | 710/72 |

FOREIGN PATENT DOCUMENTS

| | | | |
|---|---|---|---|
| JP | 406115274 A | | 4/1994 |
| JP | 6-324821 | * | 11/1994 |

* cited by examiner

*Primary Examiner*—Ilwoo Park
(74) *Attorney, Agent, or Firm*—Fitzpatrick, Cella, Harper & Scinto

(57) ABSTRACT

There is disclosed a printer or copying machine which operates according to several different functional and operational modes, a host computer which sends a print or copy order to the printer or copying machine, which order may include the number of copies to be made, the time of printing or copying, and an operational mode, such as size of copy, two-sided copying, collating, stapling, etc., and an accounting means which calculates charges based on the order before it is carried out by the printer or copying machine and which transmits those charge to the host computer.

8 Claims, 6 Drawing Sheets

PRINTING SYSTEM ADAPTED TO CHANGE A PRINTING OPERATION TO BE PERFORMED BASED ON A RESULT OF AN ACCOUNTING OPERATION

This application is a division of U.S. application Ser. No. 08/889,180, filed Jul. 7, 1997, now U.S. Pat. No. 6,385,675, which is incorporated herein by reference.

BACKGROUND OF THE INVENTION

1. Field of the Invention

This invention relates to a printing system, and more particularly, to a system in which accounting (cost assessment) is based on the specific functions used in the course of outputting a given body of text data or image data.

2. Related Background Art

In order to account for the usage of a copying machine a copy shop operator counts the number of pages to be copied and the number of copies of each page; and he makes his accounting based on these numbers. However, this accounting does not take into consideration any special functions that are carried out in connection with the copying. Recently, several special functions have been provided in automatic copying machines, such as automatic sorting, automatic stapling, double sided printing, etc. These special functions add value to the copied product; and therefore there is a need to account for their operation when calculating the usage of the copying machine.

SUMMARY OF THE INVENTION

It is an object of this invention to provide a printing system in which use of the above-mentioned specific functions can be accounted for appropriately.

According to one aspect of the present invention, there is provided a printing system which comprises means for performing a printing operation according to a requested mode; and means for performing an accounting operation according to the printing operation.

According to more specific aspects of the invention, the accounting operation is carried out based on one or more of the time or date of printing, the number of pages to be printed or copied, the size of the copy or document to be printed, the kind of paper to be printed on, and the name of the user.

According to a further aspect of the invention, there is provided a printing system which comprises means for printing documents, means for carrying out an accounting operation in regard to the operation of the printing means, means for printing based on a predetermined program, and means for storing the program in a manner such that it can be executed only upon receipt of a predetermined password.

According to yet another aspect of the invention, there is provided a novel printing system having a host computer and a printer which are connected with each other, and wherein the printer prints according to a plurality of operational modes. In this aspect the printing system comprises means for carrying out accounting operations based on the operational modes, means for executing a printing operation based on a command from the host computer, and means for displaying an amount of charge for the printing operation to the host.

According to additional specific features of the invention, there are provided means for prohibiting printing if the charge exceeds a predetermined amount or prohibiting printing until after the amount of charge has been transmitted to the host computer.

DETAILED DESCRIPTION OF THE PREFERRED EMBODIMENTS

The first embodiment of this invention will be described with reference to FIG. 1.

Figure 1:
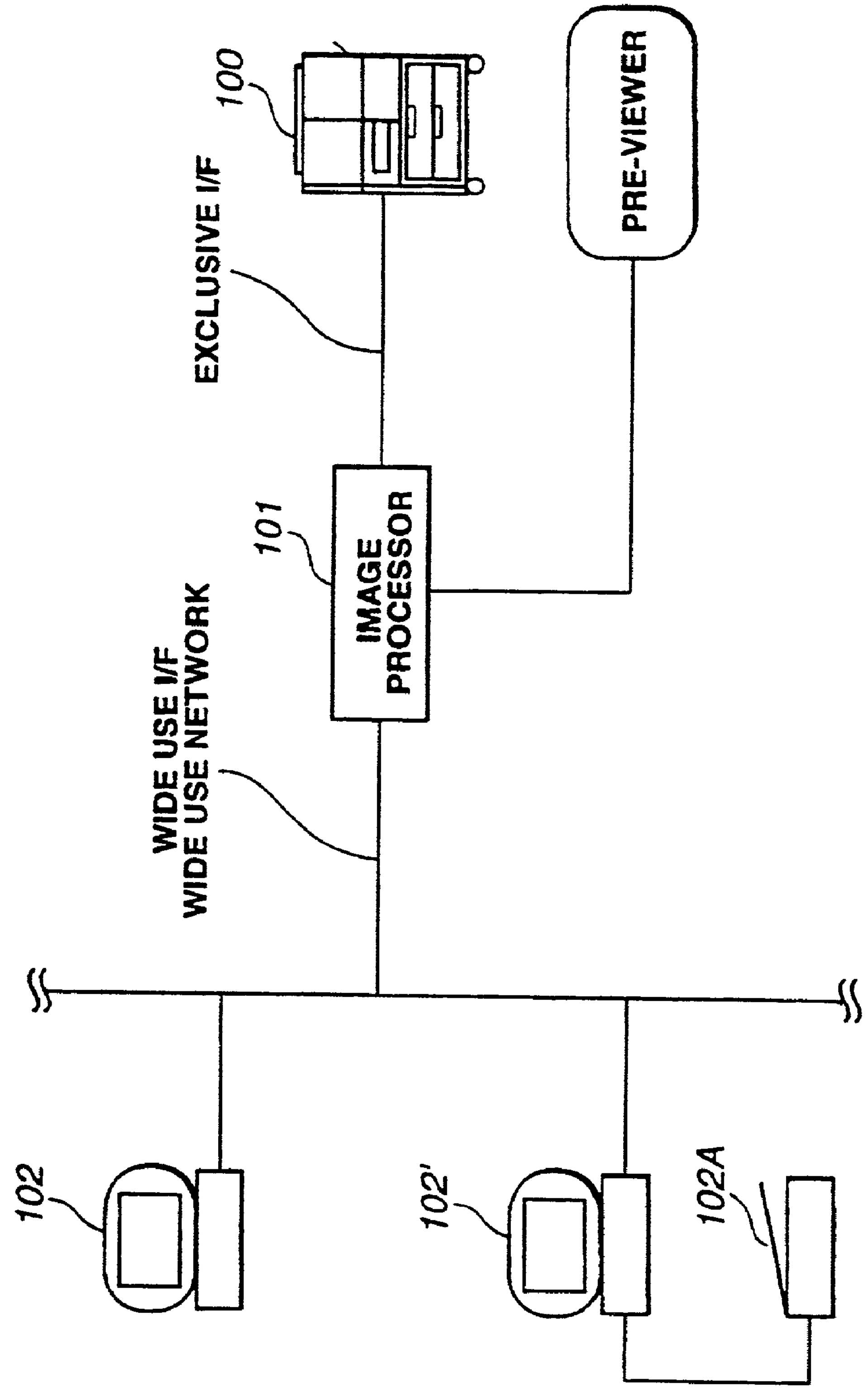
FIG. 1 is a block diagram showing one embodiment of a printing system according to the present invention.

The system of FIG. 1 comprises a digital copying machine 100, an image processor 101 and a plurality of host computers 102. The digital copying machine 100 is connected to the image processor 101 via an exclusive interface (I/F). The host computers, 102' are connected with the image processor apparatus 101 via a wide area interface or network such as Ethernet.

Image and text data (PDL) as well as commands from the host computers, 102' are transmitted to the digital copying machine 100 via the image processor 101.

In this embodiment, the digital copying machine 100 has several different copying functions such as a full color copying function, a mono-color copying function, a tri-color copying function, a twin-color copying function, etc., as well as several kinds of extension functions such as a printing function, a sorting function, a stapling function, a preview function, a color copy mode specifying function, and so on.

The full-color copying function is carried out by using the colors Y (Yellow), M (Magenta), C (Cyan) and K (Black). The mono-color copying function is carried out by using only K (Black). The tri-color copying function is carried out by using Y (Yellow), M (Magenta) and C (Cyan). The twin-color copying function is carried out by using the colors R (Red) and K (Black). The preview function is used for adjusting colors and for publishing by displaying the expected image on the screen of the host computer 102. The color copy mode specifying function is used to specify the printing mode, that is, if it is to be the full-color copy mode, the tri-color copy mode, the twin-color copy mode or the mono-color copy mode.

Figure 2:
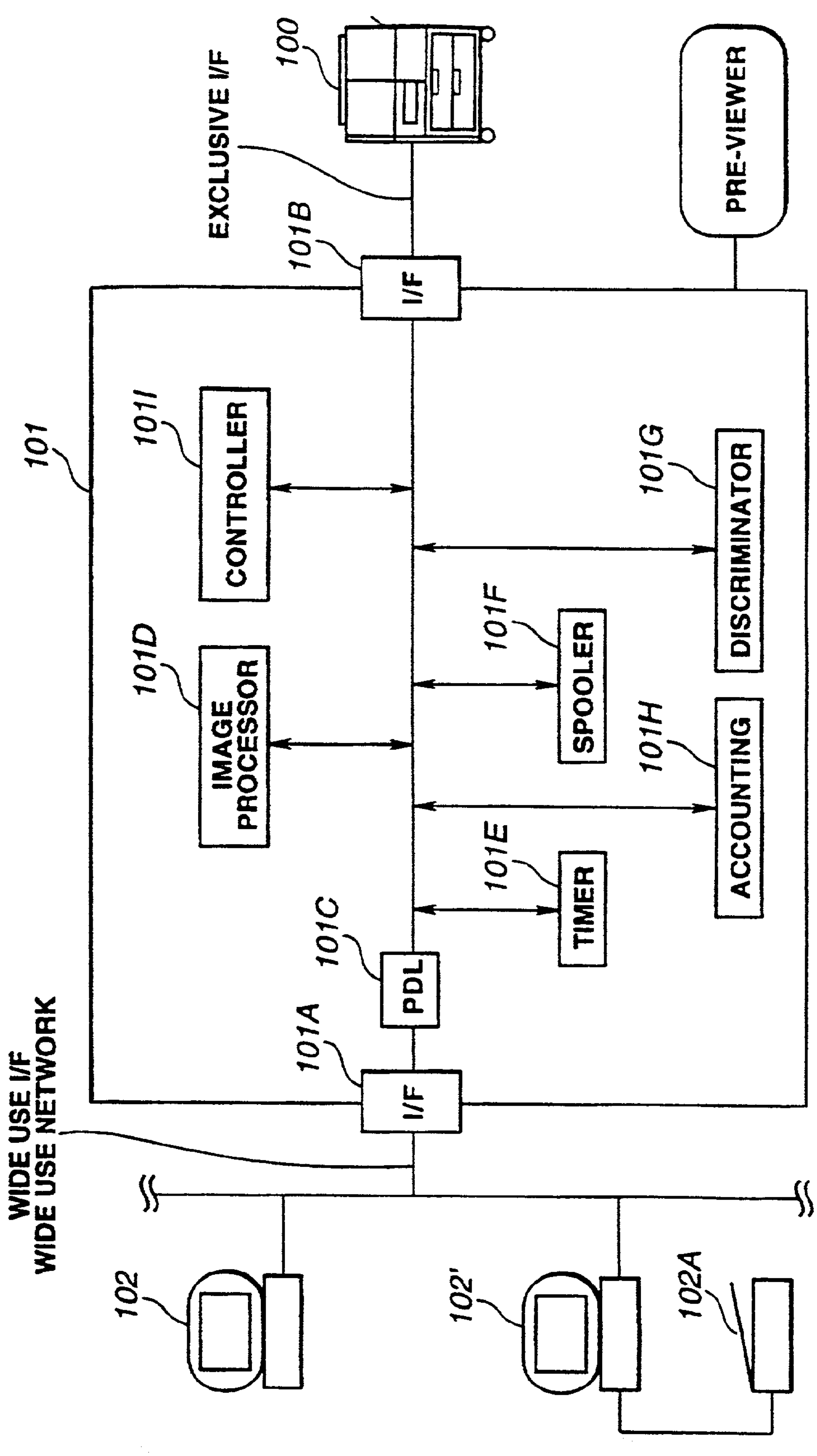
FIG. 2 is a block diagram of an image processor in the system of FIG. 1.

As shown in FIG. 2, the image processor 101 includes an interface 101A for transferring data to and from the host computers 102 via the wide area network. The image processor 101 also includes an exclusive interface 101B for transferring the data to and from the digital copying machine 100. There are also provided in the image processor 101, a PDL processor 101C for processing the PDL (image and text) data, an image processor 101D for carrying out several kinds of image processing such as gamma processing for the image data, a timer 101E, a circuit 101F for managing and logging each job, including a spooler, a discriminator 101G for checking the authenticity of each job order, an account processor 101H for processing the cost of the job based on an accounting program, and a controller 101I for controlling the accounting operations, the image processing operations, the communications and the changing of the accounting programs. The controller 101I controls the digital copying machine 100 so that it carries out a function specified by one of the host computers 102. The controller then logs the job and prepares an account based on the log. It then gives an account notice to each host computer according to a predetermined timing.

The account notice may be sent to the appropriate each host computer 102 along with each copying job, or periodically, such as monthly, or when the total charge exceeds a predetermined amount, or as requested by the user.

The accounting operation is carried out based on the following parameters: an acceptance time (this may be, for example, a week, a day or a holiday, daytime or nighttime, etc.), the number of pages to be copied, the kind of paper to be used in the copying operation, such as ordinary paper or OHP (Overhead Transparency Paper), etc., paper size, size of the file, name of the user (discountable or not), copy mode (full-color copy or mono-color copy, etc. in a case where the copying machine 100 is a color copying machine), necessity for logging after copying, user functions (these may be expansion functions or ordinary functions) and time. In this embodiment, these parameters may be set by the host computer 102.

In this embodiment, the image processor 101 normally executes the accounting operation when the copying operation is completed. The accounting operation for each parameter is executed according to a software program in the image processor 101. The specific program or the specific parameters may be changed upon inputting a password or by carrying out a special operation for that purpose.

The host computer prints the text data and image data which is picked-up by a digital camera (not shown) or by a scanner 102A. The data, which may include several kinds, may be delivered via a network, or reproduced by means of a player such as a CD-ROM player, etc., by using the digital copying machine 100 and the image processor 101.

Figure 3:
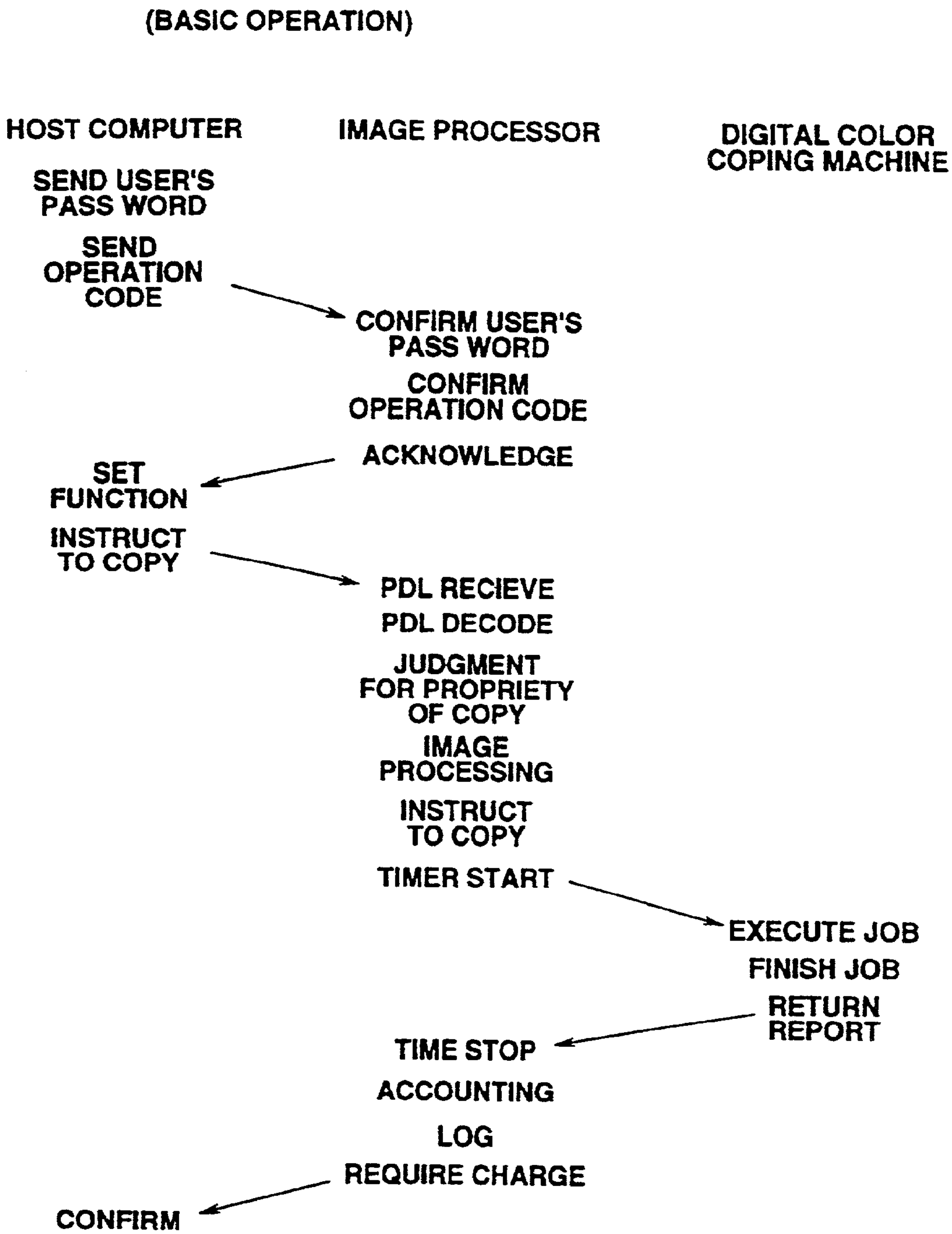
FIG. 3 is a flow chart for explaining the operation of the system of FIG. 1.

The basic operation of the system will now be described with reference to FIG. 3.

The host computer 102 transfers the user's password and operation code to the image processor 101. The image processor 101 confirms the password and an operation code, and decides if the user is authorized to operate the copying machine 100. The image processor 101 gives notice of the decision to the host computer 102; and the image processor 101 then confirms this information to the user. For example, the image processor 101 confirms whether the user is permitted to access the program, to change the program, etc.

After confirmation, the user specifies the image or document to be copied, sets the parameters and the copy mode, and then issues instructions to begin copying. The host computer 102 changes the image data or the text data to PDL data which includes the copy mode code, expansion function code, etc. The host computer 102 sends the PDL data and the user's ID (identification) code or machine's identification code to the image processor 101.

The image processor 101 stores the PDL data in a memory and records the PDL data in each user's assigned memory region according to each user's turn.

The discriminator 101G of the image processor 101 ascertains whether there is any prohibition regarding copying or printing of the PDL data. If the PDL data relates to a bill (i.e., money) or securities or involves copyrighted material, the copying of such data is prohibited. Accordingly, the discriminator 101G confirms that the PDL data is not such prohibited data. Then the image processor 101 carries out predetermined image processing.

In this embodiment, the discriminator 101G determines whether the data is copyable or not. This determination is made according to a control code which is sent with the PDL data from the host computer 102, and which represents several kinds of regulations regarding restrictions on copying, image processing etc. The discriminator 101G first reads the control code and then makes its decision based on the code. The various regulations corresponding to the control code are stored in a controlled access memory.

The discriminator 101G may include a function for checking specified images or like, copyright marking and the design of billing forms.

The image processor 101 instructs the digital copying machine 100 to carry out copying and expansion functions, and to begin operation of a clock in order to ascertain copying time.

At each job's turn, the digital copying machine 100 carries out the job (i.e., copying in a specified copy mode and carrying out expansion functions). Then the digital copying machine 100 reports to the image processor 101 that the copying job will be completed in the normal manner.

The image processor 101 clocks the copy time, and confirms whether the copying operation has been completed in the normal manner. Then, if this has been done, the image processor 101 carries out an accounting operation. The image processor 101 carries out this accounting operation based on the copy mode, the number of copies, the copy time, etc. The image processor 101 records the results of the accounting operation in a log and communicates the results to the appropriate host computer 102.

Figure 4:
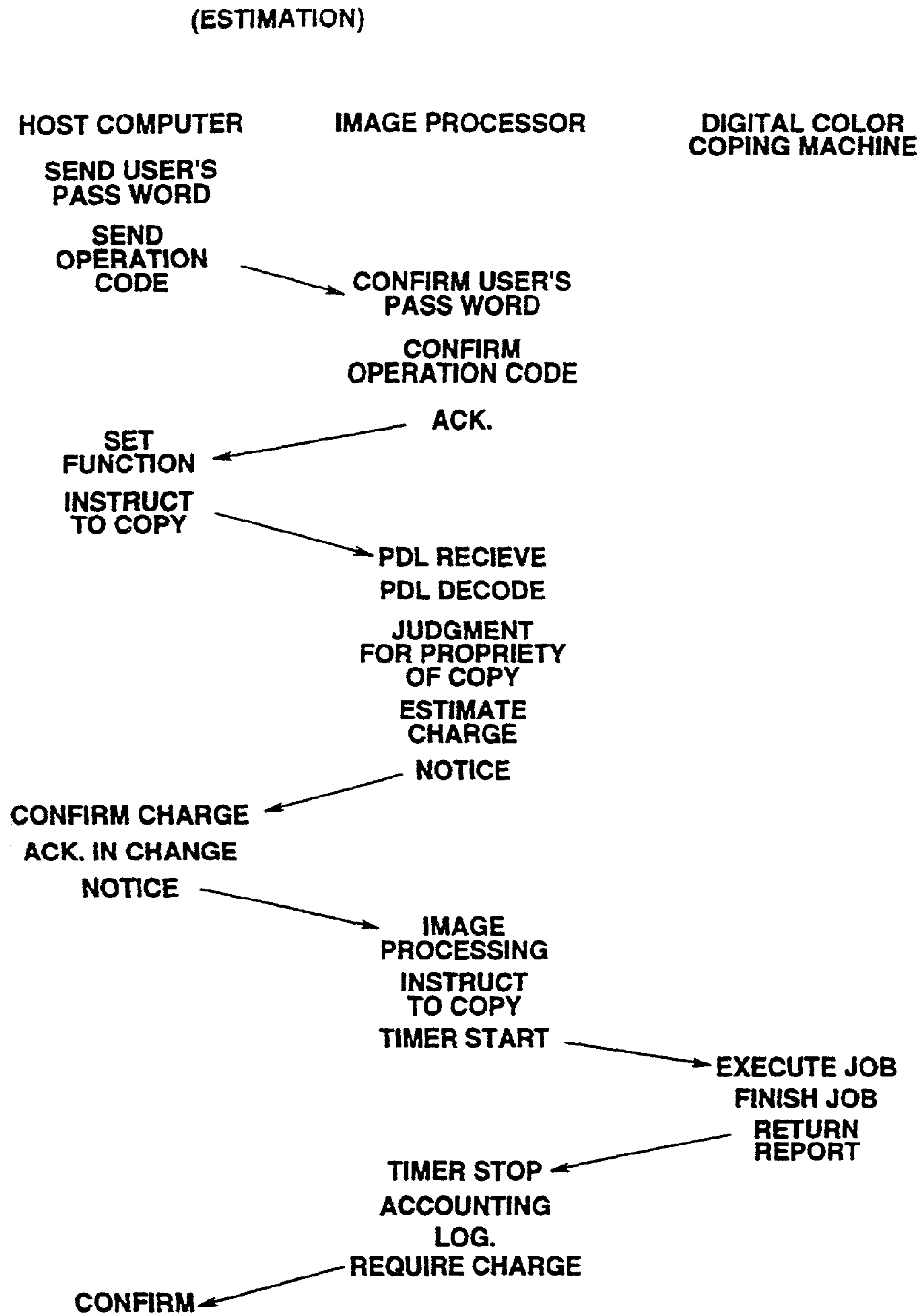
FIG. 4 is a flow chart for explaining the operation of a first modification of the system of FIG. 1.

Next, another operation will be described with reference to FIG. 4. In the above-described embodiment, the accounting operation is performed only by the image processor 101. However, in this next embodiment, the user can confirm the amount of the charge and can change the functions specified by the use, if needed.

As in the above described first embodiment, the user in this embodiment specifies the image or document to be copied, sets the parameters and the copy mode, and then instructs the system to begin the copying operation. The image processor 101 stores the PDL data into the user's assigned memory according to the user's turn.

The discriminator 101G of the image processor 101 ascertains whether there is any restriction as to the copying or printing of the PDL data. The image processor 101 also carries out to an accounting operation and calculates an estimated charge. Then the image processor 101 transmits the estimated charge to respective host computer 102.

The host computer 102 displays the estimated amount of charge to the user so that the user may change the specified functions.

The host computer 102 then gives notice of completion of the confirmation and the charge to the image processor 101. The image processor 101 carries out the image processing and sends the PDL data and a start copy instruction to the digital copying machine 100. The following operations of this embodiment are the same as for the previous embodiment. Thus, the image processor 101 carries out the accounting operation based on the job report, the represented number of pages, the copying mode, etc. According to this embodiment, a user can make copies while remaining within budget; and any possible problems regarding charges will be avoided beforehand.

Also, an upper limit of the amount to be charged may be preset, and the image processor 101 may give the notice of any excess when the charge amount exceeds this upper limit. This also helps to avoid problems in advance.

Figure 5:
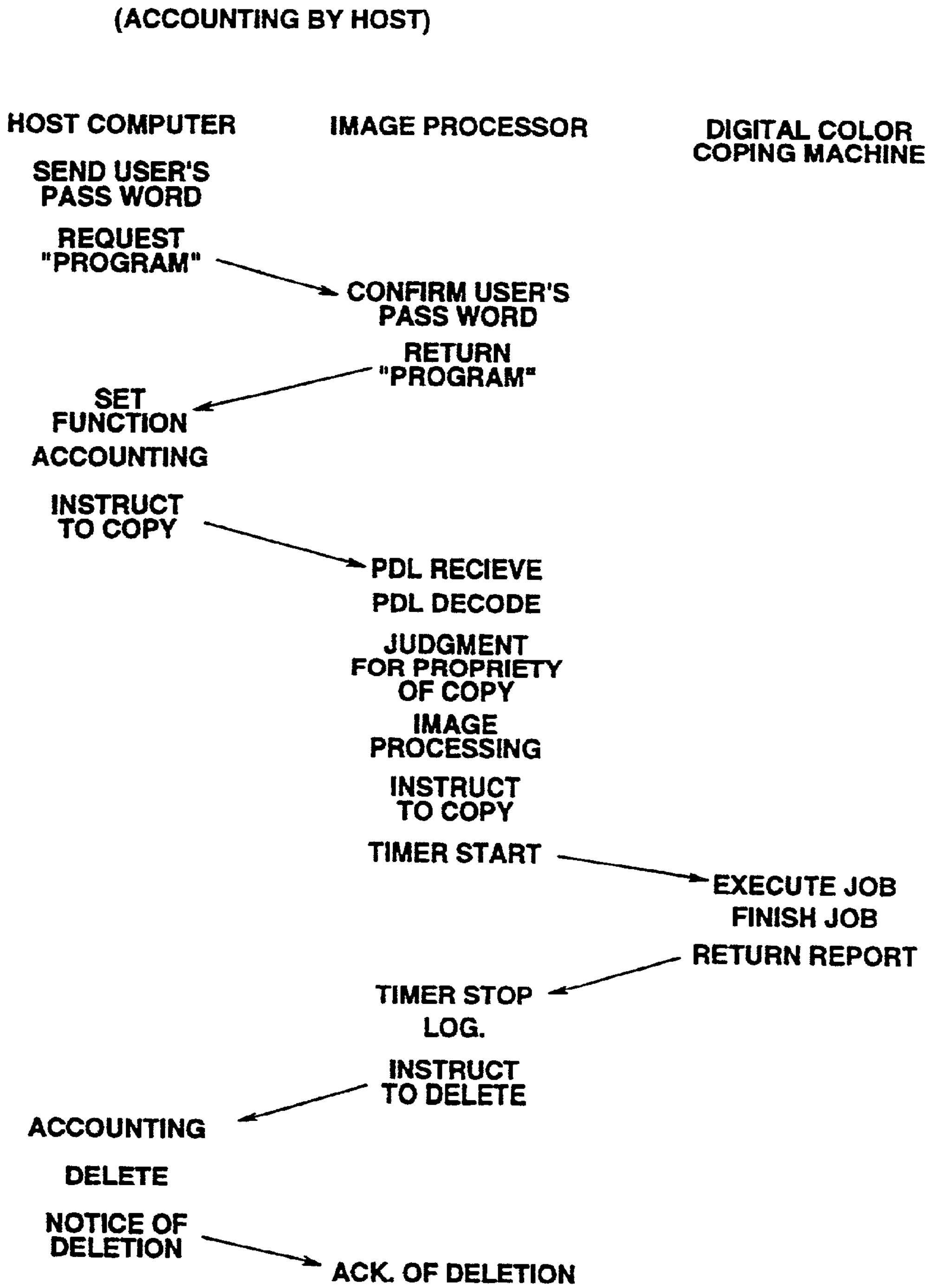
FIG. 5 is a flow chart for explaining the operation of a second modification of the system of FIG. 1.

Another operation will be described with reference to FIG. 5. In the above described embodiment, the accounting operation is carried out the image processor 101. In this embodiment however, the accounting operation is carried out by the host computer 102.

The host computer 102 specifies the functions and the document or documents to be copied, and requests the image processor 101 to send program software for an accounting operation.

The image processor 101 sends the program software to the host computer 102 after checking the user's code sent from the host computer 102. The host computer 102 then uses the program software to estimate the amount to be charged for the copying which is to be carried out according to the specified functions, and displays the amount so that it can be confirmed by the operator; and so that the operator can change the specified functions if desired.

After completion the final confirmation, the host computer 102 sends the PDL data to the image processor 101 and instructs it to start the copying operation as in the previous embodiment.

The operation of this embodiment in the same as that of the previously described embodiment. The image processor 101 transfers a job completion report, which has been sent from the digital copying machine 100, to the host computer 102. The image processor 101 then requests the host computer to delete the program software for the accounting operation. The host computer 102 carries out the accounting operation based on the job completion report, and deletes the program software.

Figure 6:
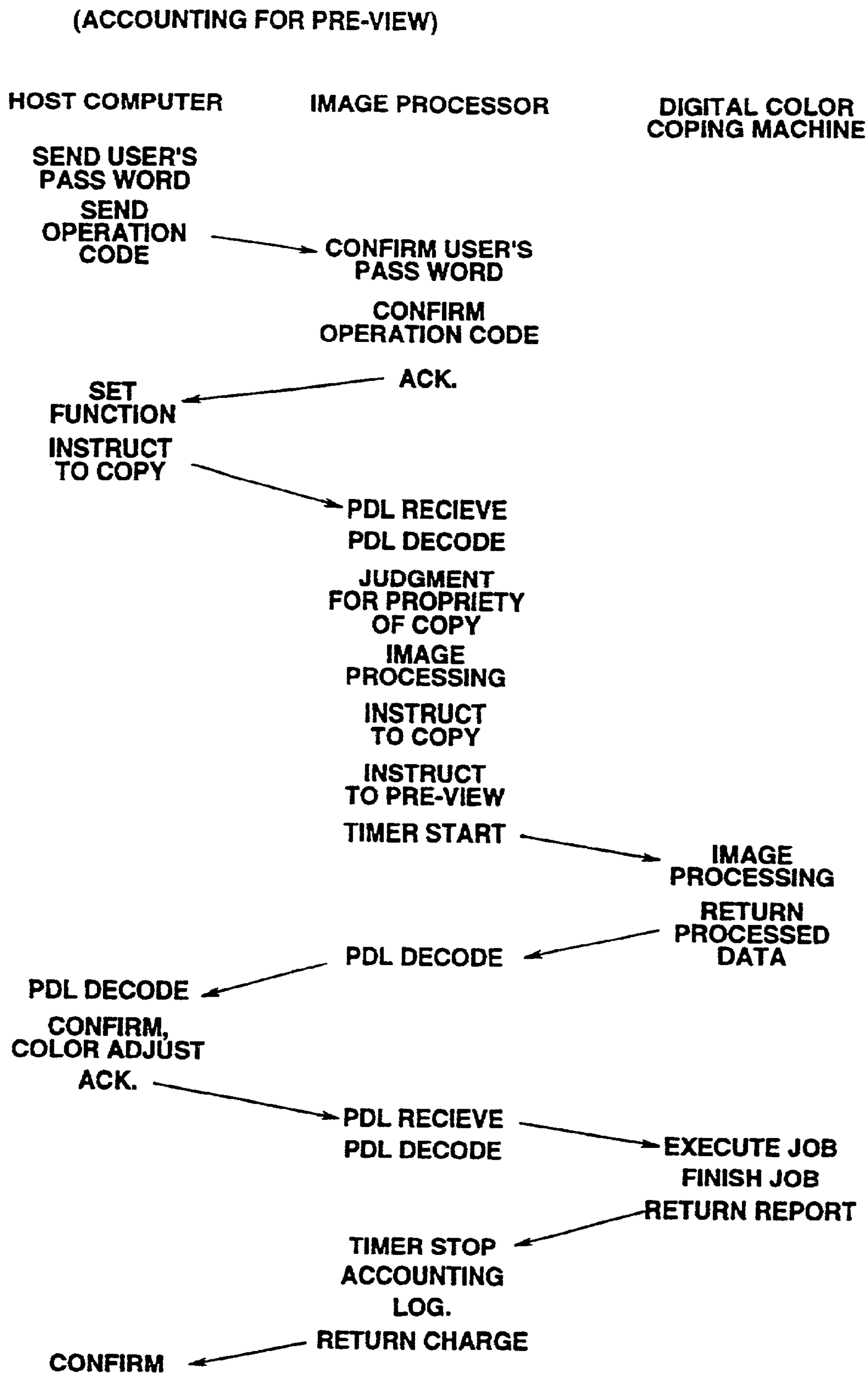
FIG. 6 is a flow chart for explaining the operation of a third modification of the system of FIG. 1.

Next, another operation, in which a preview operation is carried out, will be described with reference to FIG. 6.

The operation of this embodiment is basically the same as in the previously described embodiments. However, in this embodiment, before a copying operation is executed, the image data which is processed by the digital copying machine 100 is transferred to the host computer 102 via the image processor 101. The host computer 102 displays an image based on the image data which was sent from the digital copying machine 100 so that the user can confirm the image, adjust the color of the image, etc.

The user specifies the document, the image to be copied and the expansion functions by using the host computer 102. Then the user issues an instruction to start copying by operation of the host computer 102.

The details of this operation will now be described.

The host computer 102 transforms the image data to be copied into the PDL data. This data includes the copy mode code, an expansion function code and a command for preview. The host computer 102 transfers this PDL data to the image processor 101 via a network. In addition, the host computer 102 transfers the user's password and operation code to the image processor 101.

The image processor 101 stores the PDL data in a memory, and records the PDL data in each user's assigned region of the memory according to the user's turn.

The discriminator 101G of the image processor 101 discriminates whether copying or printing according to the PDL data is prohibited. Then the image processor 101 carries out the prescribed image processing.

The image processor 101 instructs the digital copying machine 100 to carry out copying and the expansion functions, and to begin clocking of the copying time.

The digital copying machine 100 does image processing which is different from the image processing carried out in the image processor 101; and it returns the processed image data to the image processor. The image processor 101 transforms the processed image data into the PDL data, and transfers the PDL data to the host computer 102.

The host computer 102 displays the processed image data so as to confirm the data and to permit the user to adjust the color and details of picture based on the processed image data. Then the host computer 102 transforms the image data into PDL data, and transfers the PDL data to the image processor 101.

The digital copying machine 100 carries out the requested jobs (i.e., copying in specified copy mode and carrying the requested expansion functions). Upon completion of the copying operation, the digital copying machine 100 transmits a report to the image processor 101 that the copying operation is completed is finished and that the copying mode is normal.

The image processor 101 stops clocking of the copy time, and confirms if the copying operation is completed and was performed normally. Then, if the copying operation was normal, the image processor 101 carries out the accounting operation. This accounting operation is based on the copy mode, the number of copies, the copy time, etc. The image processor 101 records the amount in a log and informs the host computer 102 of the amount.

According to the above embodiments, an accounting corresponding to particular parameters is obtained automatically. As a result, an operator can carry out an accounting operation in a simple manner and with little difficulty.

It is easy to change or modify the charge for copying and printing by changing the program software and associated parameters.

As mentioned above, it is possible with this embodiment to automatically request a charge according to several kinds of service which may be specified by a user. Further, this embodiment can automatically request a charge according to copy mode and functions requested by a user.

What is claimed is:

1. An information processing apparatus that is connectable with a host computer via a network to perform printing processes on data provided by the host computer comprising:

a first receiver unit for receiving data and first information relating to a printing process extension function from the host computer;

a processor for executing an accounting operation based on the received first information and for calculating an estimated charge;

a determination unit for determining whether the estimated charge exceeds a predetermined amount or not;

a notification unit for notifying the estimated charge to the host computer in accordance with a result of the determination;

a second receiver unit for receiving second information for modifying the printing process extension function, the second information being received from the host computer after a notification by said notification unit; and an image processor unit for executing image processing of the data received by the first receiver unit on the basis of the second information for modifying the printing process extension function.

2. An apparatus according to claim 1, wherein the printing process extension function utilizes a full-color printing process, a twin-color printing process, a mono-color printing process, a tri-color printing process, an area-specified printing process, a double-sided printing process, a stapling function, or a sorting function.

3. An apparatus according to claim 1, wherein the host computer sets parameters of the printing process extension function and issues instructions to begin printing.

4. An apparatus according to claim 1, further comprising:

permission unit to permit the host computer to adjust the printing process extension function based on the estimated charge.

5. An information processing method comprising:

receiving data and first information relating to a printing process extension function from a host computer via a network;

executing an accounting operation based on the received first information and calculating an estimated charge;

determining whether the estimated charge exceeds a predetermined amount or not;

notifying the estimated charge to the host computer in accordance with a result of the determination;

receiving second information for modifying the printing process extension function, the second information being received from the host computer after a notification by said notification unit; and executing image processing of the data received by the first receiver unit on the basis of the second information for modifying the printing process extension function.

6. A method according to claim 5, further comprising:

receiving second information from the host computer for modifying the printing process extension function after the estimated charge is notified to the host computer; and executing image processing of the data on the basis of the second information for modifying the printing process extension function.

7. A computer-readable memory medium in which computer-executable process steps are stored, the process steps for printing, wherein the process steps comprise:

receiving data and first information relating to a printing process extension function from a host computer via a network;

executing an accounting operation based on the received first information and calculating an estimated charge;

determining whether the estimated charge exceeds a predetermined amount or not;

notifying the estimated charge to the host computer in accordance with a result of the determination;

receiving second information for modifying the printing process extension function, the second information being received from the host computer after a notification by said notification unit; and executing image processing of the data received by the first receiver unit on the basis of the second information for modifying the printing process extension function.

8. A computer-readable memory medium according to claim 7, the process steps further comprising:

receiving second information from the host computer for modifying the printing process extension function after the estimated charge is notified to the host computer; and executing image processing of the data on the basis of the second information for modifying the printing process extension function.

* * * * *

UNITED STATES PATENT AND TRADEMARK OFFICE

CERTIFICATE OF CORRECTION

PATENT NO. : 6,973,514 B2
APPLICATION NO. : 10/078431
DATED : December 6, 2005
INVENTOR(S) : Yamaguchi It is certified that error appears in the above-identified patent and that said Letters Patent is hereby corrected as shown below:

On Title Page, Col. 1 Item (30), Foreign Application Priority Data, "7-176428" should read -- 8-176428 --.
Title Page Item (57) ABSTRACT, Line 10, "charge" should read -- charges --.

DRAWINGS:
Sheet 3, Figure 3, Sheet 4, Figure 4, Sheet 5, Figure 5 and Sheet 6, Figure 6, "coping" should read -- copying --.

COLUMN 2:
Line 28 and 32, "computers, 102'" should read -- computers 102' --.

COLUMN 4:
Line 40, "above described" should read -- above-described --.

COLUMN 5:
Line 6, "above described" should read -- above-described --; and
Line 26, "in" should read -- is --.

Signed and Sealed this

Twenty-sixth Day of September, 2006

JON W. DUDAS
*Director of the United States Patent and Trademark Office*